(12) United States Patent
Jaffe et al.

(10) Patent No.: US 7,499,507 B2
(45) Date of Patent: Mar. 3, 2009

(54) SYNCHRONIZATION MODULE USING A VITERBI SLICER FOR A TURBO DECODER

(75) Inventors: Steven T. Jaffe, Irvine, CA (US); Kelly B. Cameron, Irvine, CA (US); Christopher R. Jones, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 743 days.

(21) Appl. No.: 09/729,443

(22) Filed: Dec. 4, 2000

(65) Prior Publication Data

US 2002/0067779 A1    Jun. 6, 2002

Related U.S. Application Data

(60) Provisional application No. 60/168,809, filed on Dec. 3, 1999.

(51) Int. Cl.
*H03D 1/00* (2006.01)
(52) U.S. Cl. .................. 375/341; 375/326; 375/344; 375/293; 375/354; 375/364; 455/119; 348/735
(58) Field of Classification Search ................. 375/326, 375/341, 240.28, 293, 354, 344, 364; 455/119
See application file for complete search history.

(56) References Cited

U.S. PATENT DOCUMENTS 4,677,625 A    6/1987    Betts et al.

(Continued)

FOREIGN PATENT DOCUMENTS

EP    0 843 437 A2    5/1998

(Continued)

OTHER PUBLICATIONS

C. Langlais, Synchronization in the carrier recovery of a satellite link using turbo-codes with the help of tentative decisions, IEE Colloquium on Turbo Codes in Digital Broadcasting—Could It Double Capacity?, Nov. 22, 1999 pp. 5/1-5/7.*

(Continued)

*Primary Examiner*—Juan A Torres
(74) *Attorney, Agent, or Firm*—Garlick Harrison & Markison; Shayne X. Short

(57) ABSTRACT

A method for synchronizing receivers that receive turbo encoded signals to a received signal. Turbo encoding may enable signals to be decoded at a much lower signal to noise ratio than previously practical. A traditional method of synchronizing a receiver to an incoming signal is to use a slicer to determine a received symbol and then to compare the determined symbol to the incoming waveform, in order to adjust the phase of the slicer with respect to the incoming signal. At signal low levels, at which turbo encoded signals may be decoded, this slicing method may be prone to errors that may disrupt the synchronization of the receiver to the incoming signal. By replacing the slicer by a Viterbi decoder with zero traceback (i.e. one which does not consider future values of the signal only past values) a prediction as to what the incoming signal is can be made. Because the Viterbi decoder can consider past signal values it can predict the present symbol being received with higher reliability than by using a slicer, which considers only the present value of the incoming signal.

54 Claims, 4 Drawing Sheets

U.S. PATENT DOCUMENTS

| | | | |
|---|---|---|---|
| 4,677,626 A | | 6/1987 | Betts et al. |
| 4,833,693 A | * | 5/1989 | Eyuboglu .................... 375/254 |
| 4,979,175 A | | 12/1990 | Porter |
| 5,181,209 A | | 1/1993 | Hagenauer et al. |
| 5,349,608 A | | 9/1994 | Graham et al. |
| 5,406,570 A | | 4/1995 | Berrou et al. |
| 5,446,747 A | * | 8/1995 | Berrou ....................... 714/788 |
| 5,563,897 A | | 10/1996 | Pyndiah et al. |
| 5,666,378 A | | 9/1997 | Marchetto et al. |
| 5,675,585 A | | 10/1997 | Bonnot et al. |
| 5,703,911 A | | 12/1997 | Lin et al. |
| 5,721,745 A | | 2/1998 | Hladik et al. |
| 5,734,962 A | | 3/1998 | Hladik et al. |
| 5,742,612 A | | 4/1998 | Gourgue et al. |
| 5,761,248 A | | 6/1998 | Hagenauer et al. |
| 5,784,300 A | | 7/1998 | Neumeier et al. |
| 5,841,818 A | | 11/1998 | Lin et al. |
| 5,907,582 A | | 5/1999 | Yi |
| 5,933,462 A | | 8/1999 | Viterbi et al. |
| 5,970,085 A | | 10/1999 | Yi |
| 5,974,091 A | * | 10/1999 | Huff .......................... 375/265 |
| 5,978,365 A | | 11/1999 | Yi |
| 5,983,384 A | | 11/1999 | Ross |
| 5,983,385 A | | 11/1999 | Khayrallah et al. |
| 5,996,104 A | | 11/1999 | Herzberg |
| 6,016,568 A | | 1/2000 | Wolf et al. |
| 6,023,783 A | * | 2/2000 | Divsalar et al. ............. 714/792 |
| 6,065,147 A | | 5/2000 | Pyndiah et al. |
| 6,119,264 A | | 9/2000 | Berrou et al. |
| 6,122,763 A | | 9/2000 | Pyndiah et al. |
| 6,182,261 B1 | | 1/2001 | Haller et al. |
| 6,202,189 B1 | | 3/2001 | Hinedi et al. |
| 6,304,996 B1 | | 10/2001 | Van Stralen et al. |
| 6,477,208 B1 | * | 11/2002 | Huff .......................... 375/265 |
| 6,490,010 B1 | * | 12/2002 | Shibuya et al. .............. 348/735 |
| 2001/0028690 A1 | | 10/2001 | Ebel, Sr. |

FOREIGN PATENT DOCUMENTS

| | | |
|---|---|---|
| EP | 0891656 B1 | 9/1999 |
| EP | 0940957 A1 | 9/1999 |
| EP | 0973292 A2 | 1/2000 |
| EP | 0986181 A2 | 3/2000 |
| EP | 1 009 098 A1 | 6/2000 |
| EP | 1030457 A2 | 8/2000 |
| FR | 2724522 A1 | 3/1996 |
| GB | 2346782 A | 8/2000 |
| WO | WO-99/19994 A2 | 4/1999 |
| WO | WO-01/43310 A2 | 6/2001 |
| WO | WO 02/19552 | 3/2002 |
| WO | WO-02/21702 A1 | 3/2002 |
| WO | WO-02/23738 A2 | 3/2002 |
| WO | WO-02/23739 A2 | 3/2002 |
| WO | WO 02/37691 | 5/2002 |
| WO | WO 02/41563 A2 | 5/2002 |

OTHER PUBLICATIONS

P. Robertson, Bandwidth-Efficient Turbo Trellis-coded Modulation Using Punctured Component Codes, IEEE Journal on Selected Areas in Communications; Feb. 1998,.p.p. 206-218,. vol. 16, No. 2.*

H. Sari, S.Mori L.Desperben, P-Vandamme, Baseband Equalisation and carrier recovery in Digital radio systems IEEE Trans., vol. COM-35 n3, pp. 319-327, 1987.*

Mottier, "Influence in tentative decisions provided by a Turbo-decoder on the carrier synchronization: Application to 64-QAM signals", COST 254 Workshop on Emerging Techniques for Communication Terminals, Toulouse France Jul. 7-9, 1997, pp. 326-330.*

Schurgers C. et al.: "Energy Efficient Data Transfer and Storage Organization for a MAP Turbo Decoder Module"; XP010355952; Aug. 16, 1999, pp. 76-81, ISBN: 1-58113-133-X.

Collins O. M. et al.: "Iterative Decoding of Non-Systematic Turbo-Codes"; 2000 IEEE International Symposium on Information Theory, Sorrento, Italy, Jun. 25-30, 2000, p. 172, ISBN: 0-7803-5857-0, XP-002196773.

Morlet C. et al.: "A Carrier Phase Estimator For Multi-media Satellite Payloads Suited to RSC Coding Schemes"; IEEE 2000, Jun. 18, 2000, pp. 455-459 vol. 1; ISBN: 0-7803-6283-7, XP-002193197.

Proakis J.G.: "Digital Communications" 1991, Modulation and Demodulation for the Additive Gaussian Noise Channel, McGraw-Hill, New York; XP002193198 181370, pp. 234-271.

Agrawal, Dakshi, et al.; "On the Phase Trajectories of the Turbo-Decoding Algorithm"; 1999 IMA Summer Program Codes, Systems and Graphical Models; http://www.comm.csl.uiuc.edu/_dakshi; Aug. 3, 1999; pp. 1-22; XP-002207488.

Buckley, Michael E., et al.; "The Design and Performance of a Neural Network for Predicting Turbo Decoding Error with Application to Hybrid ARQ Protocols"; IEEE Transactions on Communications; Apr. 2000; pp. 566-576; vol. 48., No. 4; XP-000932188; IEEE.

Ebel, William J.; "Turbo Code Implementation on the C6x"; Texas Instruments DSPS Fest '99; Aug. 1999; pp. 1-13; XP002207490; Houston, TX.

Rajashekhara, T.M.; "Signature Analyzers in Built-In-Self-Test Circuits: A Perspective"; Proceedings of the 1990 IEEE Southern Tier Technical Conference ; Apr. 25, 1990; pp. 275-281; XP-010010765.

Shao, Rose Y., et al.; "Two Simple Stopping Criteria for Turbo Decoding" IEEE Transactons on Communications; Aug. 8, 1999; pp. 1117-1120; vol. 47, No. 8; XP-000848102; IEEE.

Wu, Yufei, et al.; "A Simple Stopping Criterion for Turbo Decoding"; IEEE Communications Letters; Aug. 2000; pp. 258-260; vol. 4, No. 8, XP-000959692; IEEE.

Internet Papers: "Codes, Systems and Graphical Models"; 1999 IMA Summer Program; http://www.ima.umn.edu/csg/; Aug. 2-13, 1999; pp. 1-6; XP-002207489.

Benedetto, S., et al., "Parallel Concatenated Trellis Coded Modulation," Jet Propulsion Laboratory, California Institute of Technology, 5 pages.

Ramsey, John L., "Realization of Optimum Interleavers," *IEEE Transactions on Information Theory*, May 1970, pp. 338-345, vol. IT-16, No. 3.

Ungerboeck, Gottfried, "Channel Coding with Multilevel/Phase Signals," *IEEE Transactions on Information Theory*, Jan. 1982, pp. 55-66, vol. IT-28, No. 1.

Battail, Gérard, et al., "Subooptimum Decoding Using Kullback Principle," in *Lecture Notes in Computer Science*, 1988, pp. 93-101, No. 313, B. Bouchon et al. Eds.

Moher, Michael, "Decoding Via Cross-Entropy Minimization," *Proceedings IEEE Globecom Conference*, Houston, TX, Dec. 1993, pp. 809-813.

Dolinar, S., et al., "Weight Distributions for Turbo Codes Using Random and Nonrandom Permutations," TDA Progress Report 42-122, Jet Propulsion Laboratory, Aug. 1995, pp. 56-65.

Fazel, K., et al., "Combined Multilevel Turbo-Code with 8PSK Modulation," *Global Telecommunications Conference, 1995. Conference Record. Communication Theory Mini-Conference, Globecom '95. IEEE Singapore*, Nov. 13, 1995, pp. 649-653.

Divsalar, D., et al., "Effective Free Distance of Turbo Codes," *Electronics Letters*, Feb. 29, 1996, pp. 445-446, vol. 32, No. 5.

Hagenauer, Joachim, et al., "Iterative Decoding of Binary Block and Convolutional Codes," *IEEE Transactions on Information Theory*, Mar. 1996, pp. 429-445, vol. 42, No. 2.

Berrou, Claude, "Near Optimum Error Correcting Coding and Decoding: Turbo-Codes," *IEEE Transactions on Communications*, Oct. 1996, pp. 1261-1271, vol. 44, No. 10.

Pietrobon, Steven S., "Implementation and Performance of a Turbo/MAP Decoder," a paper submitted to the *International Journal of Satellite Communications*, Feb. 21, 1997, rev. Dec. 4, 1997 and Apr. 2, 1998, 45 pages.

Viterbi, Andrew J., "An Intuitive Justification and a Simplified Implementation of the MAP Decoder for Convolutional Codes," *IEEE Journal on Selected Areas in Communications*, Feb. 1998, pp. 260-264, vol. 16, No. 2.

Hsu, Jah-Ming, et al., "A Parallel Decoding Scheme for Turbo Codes," *ISCAS '98. Proceedings of the 1998 IEEE International Symposium on Circuits and Systems*, Monterey, CA, May 31, 1998, pp. 445-448.

Gross, W.J., et al., "Simplified MAP Algorithm Suitable for Implementation of Turbo Decoders," *Electronics Letters*, Aug. 6, 1998, pp. 1577-1578, vol. 34, No. 16.

Yue, Chung-Wai, et al., "On the FER Performance and Decoding Complexity of Turbo Codes," *1999 IEEE 49th Vehicular Technology Conference*, Houston, TX, May 16, 1999, pp. 2214-2218.

Kim, Bonghoe, et al., "Reduction of the Number of Iterations in Turbo Decoding Using Extrinsic Information," *IEEE TENCON*, 1999, pp. 494-497.

Richardson, Tom, "The Geometry of Turbo-Decoding Dynamics," *IEEE Transactions on Information Theory*, Jan. 2000, pp. 9-23, vol. 46, No. 1.

Clark, G.C., et al.; "Error-Correction Coding for Digital Communications"; Error Correction Coding for Digital Communications; 1981; pp. 349-352; XP002131001.

Shoemake, Mathew B., et al.; "Turbo Codes for High Order Constellations"; Information Theory Workshop; Jun. 22, 1998; pp. 6-7; XP010297309; IEEE; USA.

Wang, Zhongfeng, et al.; "VLSI Implementation Issues of Turbo Decoder Design for Wireless Applications"; Signal Processing Systems; Oct. 20, 1999; pp. 503-512; XP010370879.

Written Opinion for corresponding international application No. PCT/US01/28875 (dated Apr. 20, 2004).

Berrou, Claude, et al., "Near Shannon Limit Error-Correcting Coding and Decoding: Turbo-Codes (1)," IEEE International Conference on Communications '93, May 23-26, 1993, Geneva, Switzerland; 1993; p.p. 1064-1070; vol. 2/3—XP000371240; IEEE; New York, U.S.

Langlais, Charlotte, et al., "Synchronisation in the Carrier Recovery of a Satellite Link Using Turbo-Codes With the Help of Tentative Decisions," IEE Colloquium- Turbo Codes in Digital Broadcasting—Could it Double Capacity?; Nov. 22, 1999; p.p. 5/1-5/7; XP002178507; IEE, London, UK.

Robertson, Patrick, et al., "Bandwidth-Efficient Turbo Trellis-Coded Modulation Using Punctured Component Codes," IEEE Journal on Selected Areas in Communications; Feb. 1998; p.p. 206-218; vol. 16, No. 2—XP000741775; IEEE; New York, U.S.

International Search Report for Application No. PCT/US00/42545, filed on Dec. 4, 2000.

\* cited by examiner

FIG.2 —Prior Art—

SYNCHRONIZATION MODULE USING A VITERBI SLICER FOR A TURBO DECODER

CROSS-REFERENCE TO RELATED APPLICATION(S)

This application claims priority from provisional application No. 60/168,809 entitled VITERBI SLICER FOR TURBO CODES filed on Dec. 3, 1999, which is incorporated by reference herein as set forth in full.

BACKGROUND OF THE INVENTION

As coding technology improves signals can be decoded with lower signal to noise ratios. Decreasing signal levels that can be decoded require receivers that can acquire and track at lower signal levels. There is therefore a need in the art for receiver technology to enable the acquisition and tracking of signals at lower signal levels.

SUMMARY OF THE INVENTION

In one aspect of the present invention, a method of processing signals includes receiving first and second signals each being modulated on a carrier signal, the first signal preceding the second signal in time, multiplying each of the first and second signals with a reference signal having a reference frequency, adjusting the multiplied first signal based on the multiplied first and second signals, comparing the adjusted first signal to the multiplied first signal, and adjusting the reference frequency as a function of the comparison.

In another aspect of the present invention, a receiver includes an oscillator having a reference signal output with a tunable reference frequency, a multiplier to multiply a first signal with the reference signal, and to multiply a second signal, succeeding the first signal in time, with the reference signal, the first and second signals each being modulated on a carrier frequency, a decoder to adjust the multiplied first signal based on the multiplied first and second signals, and a detector to compare the adjusted first signal with the multiplied first signal, the detector being adapted to tune the reference frequency as a function of the comparison.

In yet another aspect of the present invention, a receiver includes an oscillator having a tuning input a multiplier having a first input to receive a signal, and a second input coupled to the oscillator, the signal comprising a first signal and a second signal succeeding the first signal in time, the first and second signals each being modulated on a carrier frequency, a decoder having an input coupled to the multiplier, and an output, and a detector having a first input coupled to the decoder input, a second input coupled to the decoder output, and an output coupled to the tuning input of the oscillator.

In a further aspect of the present invention, a receiver includes oscillator means for generating a reference signal having a tunable reference frequency, multiplier means for multiplying a first signal with the reference signal, and multiplying a second signal, succeeding the first signal in time, with the reference signal, the first and second signals each being modulated on a carrier frequency, decoder means for adjusting the multiplied first signal based on the multiplied first and second signals, and detector means for comparing the adjusted first signal with the multiplied first signal, the detector means comprises tuning means for tuning the reference frequency as a function of the comparison.

In yet a further aspect of the present invention, a method of processing signals having a first and second symbol each representing a constellation point, the first symbol preceding the second symbol in time, includes quantizing the first symbol to its nearest constellation point as a function of the first and second symbols, comparing the first symbol to the quantized first symbol, and adjusting a reference frequency as a function of the comparison.

In still a further aspect of the present invention, a receiver to receive a signal including first and second symbols each representing a constellation point, the first symbol preceding the second symbol in time, includes a decoder to quantize the first symbol as a function of the first and second symbols, a detector to compare the first symbol to the quantized first symbol, and an oscillator having a tunable output as a function of the comparison.

In another aspect of the present invention, a communications system includes a transmitter to transmit a signal including first and second symbols each representing a constellation point, the first symbol preceding the second symbol in time, and a receiver including a decoder to quantize the first symbol as a function of the first and second symbols, a detector to compare the first symbol to the quantized first symbol, and an oscillator having a tunable output as a function of the comparison.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
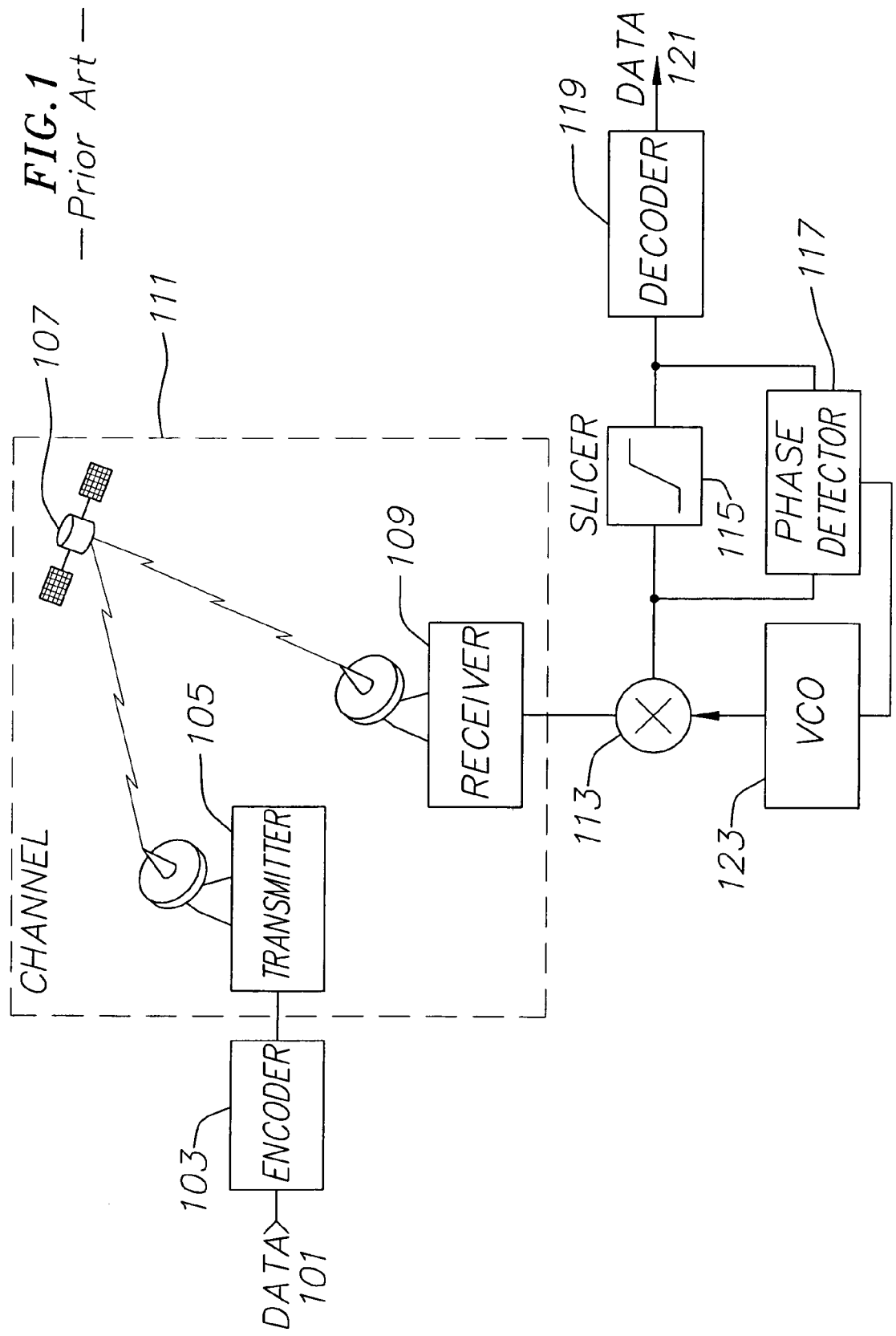
FIG. 1 is a graphical illustration of a prior art communications system.

FIG. 1 is a graphical illustration of a communications system. In FIG. 1, data 101 is provided to an encoder 103. The encoder codes the data and then provides it to a transmitter 105. The transmitter modulates the coded data on a carrier signal, amplifies the resultant signal and broadcasts it to a relay satellite 107. The relay satellite 107 then rebroadcasts the data transmission to a receiver 109. The received signal is then provided by the receiver 109 to a multiplier 113 to be multiplied by a mixer signal. A voltage controlled oscillator (VCO) 123 provides a mixer signal to the mixer with the result that the coded signal is translated to a baseband signal. The coded baseband signal comprises the data and the coding added by encoder 103. The transport interface of the signal from (and including) the transmitter 105 to (and including) the receiver 109 is referred to as a channel 111.

The coded data from the multiplier 113 is filtered (filter not shown) and provided to a slicer 115. The slicer 115 extracts symbols from the coded data stream and provides it to a decoder 119. The decoder 119 decodes the symbols and creates a data stream 121. A phase detector 117 compares the symbol found by the slicer 115 with the value input to the slicer. By comparing the signal input to the slicer to the actual symbol found by the slicer in the phase detector 117, the phase detector detects whether the slicing process is leading or lagging the actual symbol value detected within the data stream. The phase detector 117 can then adjust the voltage controlled oscillator 123 to adjust the mixer signal provided to the multiplier 113 to match the carrier signal.

Figure 2:
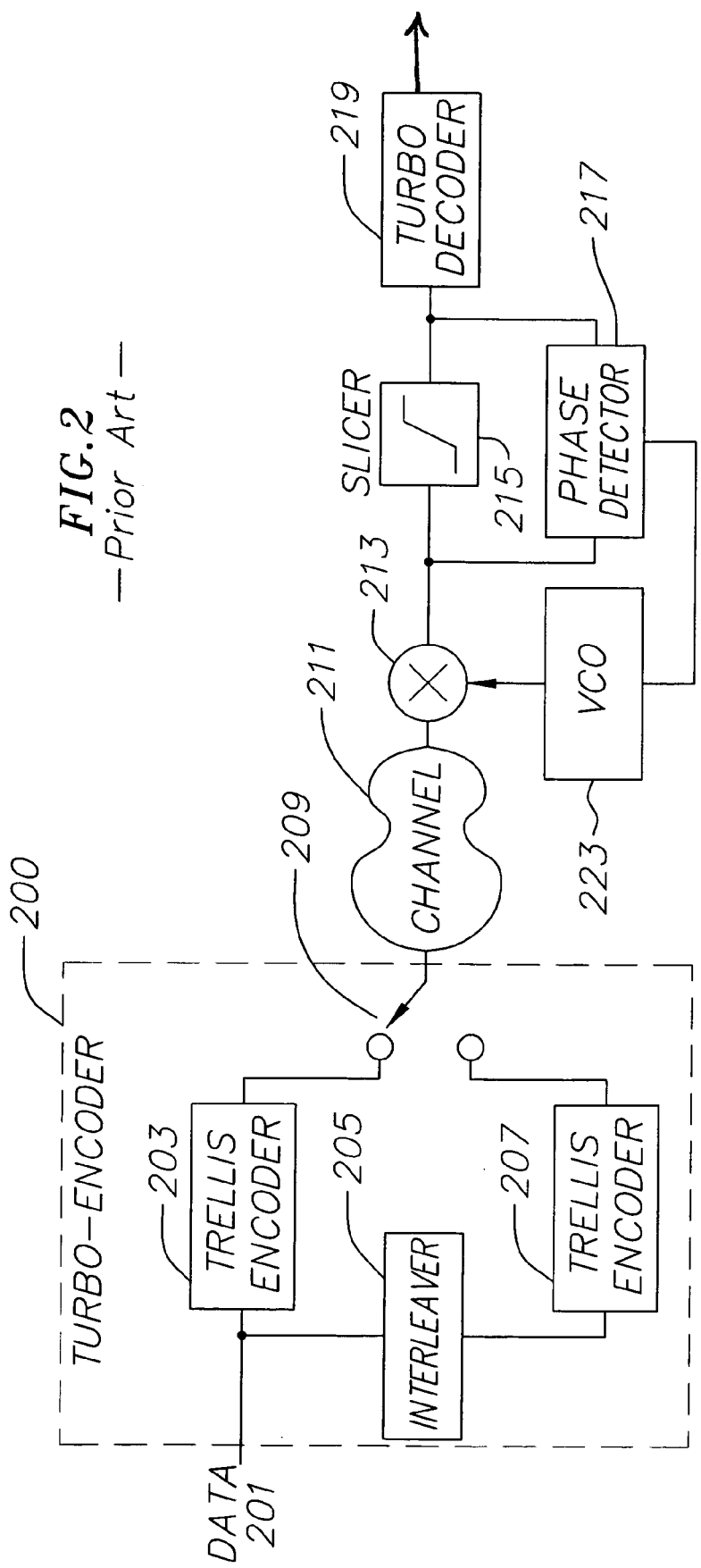
FIG. 2 is a graphical illustration of a communication system in which the coding section comprises a turbo encoder.

FIG. 2 is a graphical illustration of a communication system in which the encoder 103 is replaced by a turbo encoder 200. The turbo encoder 200 accepts data 201. The data is then encoded in a first trellis encoder 203. The data is also interleaved by an interleaver 205 and provided to a second trellis encoder 207. The second trellis encoder 207 may be identical to the first trellis encoder 203, but it may also be different. The outputs of trellis encoders 203 and 207 are then punctured by switch 209. In other words, switch 209 selects between the output of trellis encoder 203 and trellis encoder 207. The punctured output of turbo encoder 200 is then provided to a channel 211.

The signal received from the channel is then coupled into a multiplier 213, and the received signal is mixed with a mixer signal (as provided by the VCO 223), which replicates the carrier signal. The slicer 215 slices the symbols from the data stream, and the phase detector 217 detects the difference between the sliced symbol found at the output of the slicer 215 and the value input to the slicer. The output of the phase detector then adjusts the VCO 223 in order to correct the carrier signal being mixed in multiplier 213. The output of the slicer is then coupled into turbo decoder 219 to decode the turbo encoded data.

Figure 3:
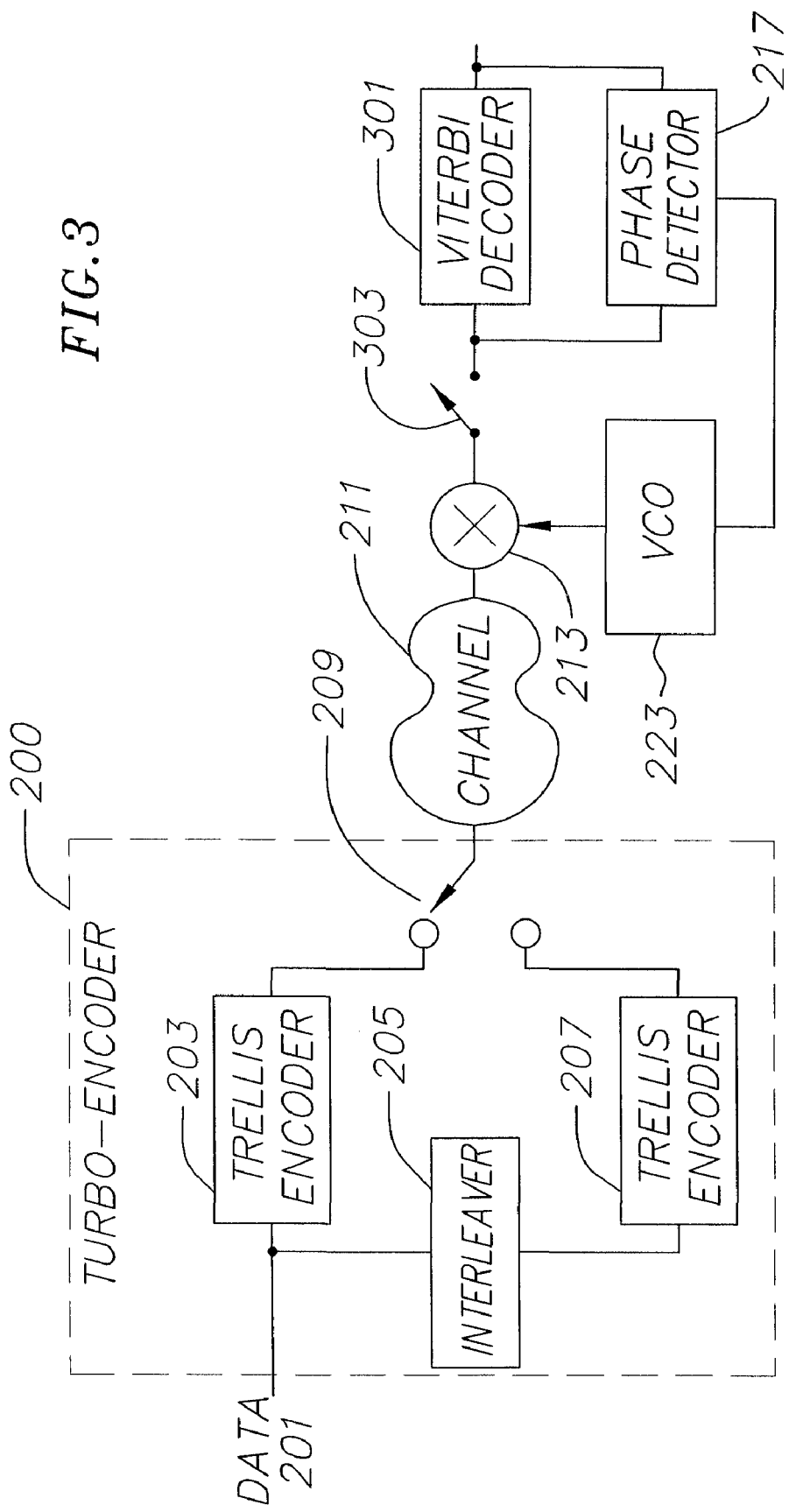
FIG. 3 is a graphic illustration of a communication system according to an embodiment of the invention.

Turbo encoder 200 is a parallel concatenated encoder. Parallel concatenated codes ("turbo codes") allow communications systems to operate near the Shannon capacity. However, when operating in this region, the signal to noise ratio may be very low. This low signal to noise ratio ($E_S/N_O$) can make synchronization with a received signal difficult. If the channel symbol error rate is greater than 1:10 (i.e., one out of ten transmitted signals is decoded incorrectly), a decision directed loop, such as illustrated in FIG. 2 (comprising the slicer 215 and phase detector 217) can fail. In order to improve the accuracy, the slicer 215 may be replaced by a Viterbi decoder as illustrated in FIG. 3. Viterbi decoders typically produce the most likely channel symbol based on past data, present data and (depending on trace-back depth) future data. A Viterbi decoder uses the past and future data as well as correlations within the data to produce a current symbol that is more likely to be correct than if only the present data is used (such as with a typical data slicer). In the embodiment illustrated in FIG. 3, future data is not available, so the Viterbi decoder 301 will examine past and present data in order to produce a symbol, which is more likely to be accurate than one determined by a slicer mechanism such as illustrated in FIG. 2. A Viterbi decoder is more likely to make an accurate decision as to what the symbol being decoded is based on a history of inputs than can a slicer, which makes a decision based on only the present input.

The turbo encoder 200, however, is a parallel concatenated encoder. Turbo encoder 200 comprises two trellis encoders separated by an interleaver 205. Any number of trellis encoders separated by interleavers may be used, but two are shown for sake of simplicity.

The interleaver 205 accepts the data 201 and interleaves or shuffles the data before providing it to the trellis encoder 207. As a result, the data provided by the lower leg of the turbo encoder comprising the trellis encoder 207 is out of sequence and must be resequenced. For this reason, switch 303 is added to the Viterbi decoder 301 so that only the symbols from trellis encoder 203 or trellis encoder 207 are used by the phase detector 217 to adjust the controlled oscillator 223. The delay introduced by interleaver 205 makes it impractical for the Viterbi decoder 301 to use symbols from both sides of the turbo encoder 200 without a buffering and delay mechanism at the input of the Viterbi decoder. Switch 303 will select every other symbol. Either a symbol from trellis encoder 203 will be selected or a symbol from trellis encoder 207 will be selected by switch 303.

Figure 4:
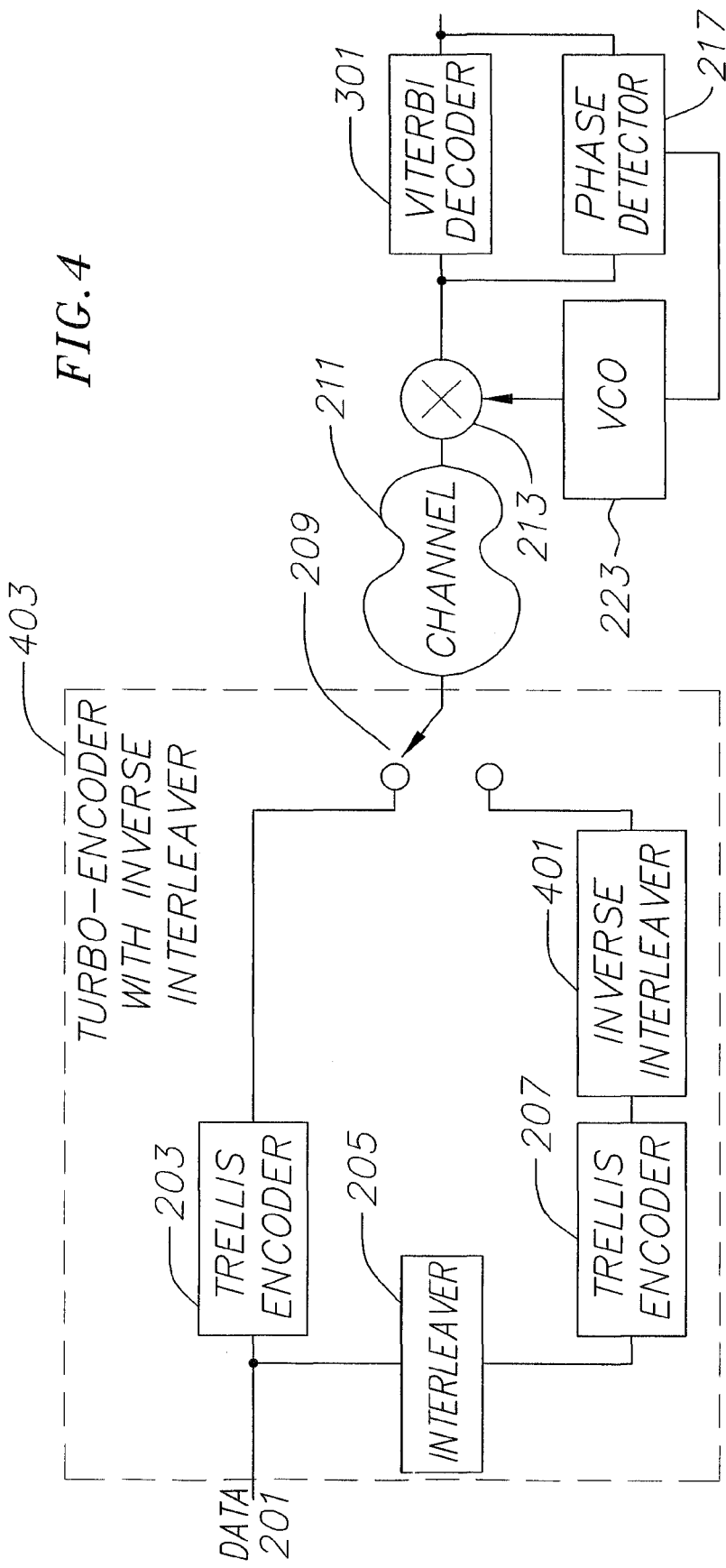
FIG. 4 is a graphic illustration of a communication system according to an embodiment of the invention.

FIG. 4 is a graphical illustration of a communication system according to an embodiment of the invention. In FIG. 4, the turbo encoder 403 has been modified by placing an inverse interleaver in series with trellis encoder 207. The inverse interleaver 401 unscrambles the order of the data which had been scrambled by the interleaver 205, after it has been trellis encoded. By utilizing inverse interleaver 401, every symbol can be used by the Viterbi decoder 301 in order to synchronize the frequency of the VCO 223.

Although a preferred embodiment of the present invention has been described, it should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. An apparatus, comprising:
    a first communication device that includes a turbo encoder having:
        a first trellis encoder that is operable to encode data thereby generating first encoded data;
        an interleaver that is operable to interleave the data thereby generating interleaved data;
        a second trellis encoder that is operable to encode the interleaved data thereby generating interleaved encoded data;
        an inverse interleaver that is operable to unscramble the interleaved encoded data that has been generated by the second trellis encoder thereby generating second encoded data; and
        a switch that is operable alternatively to select symbols from the first encoded data and the second encoded data; and
    a second communication device, coupled to the first communication device via a communication channel, that receives a signal that includes the first encoded data and the second encoded data and that includes a turbo decoder and a synchronization module that includes a Viterbi decoder, a phase detector, and a voltage controlled oscillator, wherein:
        the synchronization module is operable to recover a first symbol, a second symbol, and a third symbol from the signal;
        the first symbol is followed by the second symbol;
        the second symbol is followed by the third symbol;
        the Viterbi decoder operating with a zero traceback depth; and the turbo decoder that is operable to decode the first symbol, the second symbol, and the third symbol that are provided from the synchronization module to make best estimates of information bits encoded therein.

2. The apparatus of claim 1, further comprising:
a multiplier, whose mixing frequency is governed by the voltage controlled oscillator, that is operable to multiply the signal by the mixing frequency to match a carrier frequency of the signal to assist in recovery of the first symbol, the second symbol, and the third symbol from the signal.

3. The apparatus of claim 1, wherein:
the Viterbi decoder is operable to consider the first symbol when estimating the second symbol; and
the Viterbi decoder is operable to consider the first symbol and the second symbol when estimating the third symbol.

4. The apparatus of claim 1, further comprising:
a multiplier, whose mixing frequency is governed by the voltage controlled oscillator, that is operable to multiply the signal by the mixing frequency to match a carrier frequency of the signal to assist in recovery of the first symbol, the second symbol, and the third symbol from the signal; and wherein:
the Viterbi decoder is operable to consider the first symbol and the second symbol when estimating the third symbol; and
the phase detector is operable to employ at least one of the first symbol, the second symbol, and the third symbol to determine whether recovery of symbols from the signal, as performed by the synchronization module, is lagging or leading actual symbols within the signal and to adjust the voltage controlled oscillator based on any lagging or leading.

5. The apparatus of claim 1, further comprising:
a multiplier, whose mixing frequency is governed by the voltage controlled oscillator, that is operable to multiply the signal by the mixing frequency to match a carrier frequency of the signal to assist in recovery of the first symbol, the second symbol, and the third symbol from the signal; and wherein:
the Viterbi decoder is operable to consider the first symbol and the second symbol when estimating the third symbol;
the phase detector is operable to employ at least one of the first symbol, the second symbol, and the third symbol to determine whether recovery of symbols from the signal, as performed by the synchronization module, is lagging or leading actual symbols within the signal and to adjust the voltage controlled oscillator based on any lagging or leading; and
the adjustment of the voltage controlled oscillator is operable to make the mixing frequency to be substantially equal to the carrier frequency of the signal.

6. The apparatus of claim 1, further comprising:
a multiplier, whose mixing frequency is governed by the voltage controlled oscillator, that is operable to multiply the signal by the mixing frequency to match a carrier frequency of the signal to assist in recovery of the first symbol, the second symbol, and the third symbol from the signal; and wherein:
the third symbol output from the multiplier is provided simultaneously to both the Viterbi decoder and the phase detector;
the Viterbi decoder is operable to consider the first symbol and the second symbol when estimating the third symbol; and
the phase detector is operable to compare the third symbol output from the multiplier and the estimate of the third symbol as made by the Viterbi decoder to determine whether recovery of symbols from the signal, as performed by the synchronization module, is lagging or leading actual symbols within the signal and to adjust the voltage controlled oscillator based on any lagging or leading.

7. The apparatus of claim 1, wherein:
the communication device is coupled to at least one additional communication device via the communication channel;
the at least one additional communication device includes a turbo encoder that is operable to encode at least one information bit thereby generating at least one of the first symbol, the second symbol, and the third symbol of the signal; and
the at least one additional communication device is operable to launch the signal into the communication channel.

8. The apparatus of claim 1, wherein:
the Viterbi decoder successively processes each of the alternatively selected symbols.

9. The apparatus of claim 1, wherein: the signal is received by the second communication device; and the communication channel couples the second communication device to a relay satellite.

10. The apparatus of claim 1, wherein:
the communication channel includes a relay satellite;
the second communication device is a satellite communication receiver; and
the first at least one additional communication device is a communication transmitter.

11. A method for processing a signal, the method comprising:
performing first trellis encoding of data thereby generating first encoded data;
interleaving the data thereby generating interleaved data;
performing second trellis encoding of the interleaved data thereby generating interleaved encoded data;
performing inverse interleaving to unscramble the interleaved encoded data thereby generating second encoded data;
alternatively selecting symbols from the first encoded data and the second encoded data thereby generating a signal;
launching the signal into the communication channel;
receiving the signal from the communication channel;
recovering a first symbol, a second symbol, and a third symbol from the signal by performing frequency mixing of the signal and subsequent Viterbi decoding and phase detection of symbols generated by the frequency mixing, wherein:
the first symbol is followed by the second symbol;
the second symbol is followed by the third symbol;
the Viterbi decoding operating with a zero traceback depth; and employing a turbo decoder to decode the first symbol, the second symbol, and the third symbol that are recovered from the signal to make best estimates of information bits encoded therein.

12. The method of claim 11, further comprising:
multiplying the signal by a mixing frequency to match a carrier frequency of the signal to assist in recovery of the first symbol, the second symbol, and the third symbol from the signal.

13. The method of claim 11, wherein:
when performing Viterbi decoding, considering the first symbol when estimating the second symbol; and
when performing Viterbi decoding, considering the first symbol and the second symbol when estimating the third symbol.

14. The method of claim 11, further comprising:
multiplying the signal by a mixing frequency to match a carrier frequency of the signal to assist in recovery of the first symbol, the second symbol, and the third symbol from the signal;
when performing Viterbi decoding, considering the first symbol and the second symbol when estimating the third symbol;
employing at least one of the first symbol, the second symbol, and the third symbol when performing phase detection to determine whether recovery of symbols from the signal is lagging or leading actual symbols within the signal; and
adjusting the mixing frequency based on any lagging or leading.

15. The method of claim 11, further comprising:
multiplying the signal by a mixing frequency to match a carrier frequency of the signal to assist in recovery of the first symbol, the second symbol, and the third symbol from the signal;
when performing Viterbi decoding, considering the first symbol and the second symbol when estimating the third symbol;
employing at least one of the first symbol, the second symbol, and the third symbol when performing phase detection to determine whether recovery of symbols from the signal is lagging or leading actual symbols within the signal;
adjusting the mixing frequency based on any lagging or leading; and wherein:
the adjustment of the mixing frequency is operable to make the mixing frequency to be substantially equal to the carrier frequency of the signal.

16. The method of claim 11, further comprising:
multiplying the signal by a mixing frequency to match a carrier frequency of the signal to assist in recovery of the first symbol, the second symbol, and the third symbol from the signal;
simultaneously providing the third symbol for use in Viterbi decoding and phase detection;
when performing Viterbi decoding, considering the first symbol and the second symbol when estimating the third symbol;
when performing phase detection, comparing the third symbol output from the multiplying and the estimate of the third symbol as made in accordance with Viterbi decoding to determine whether recovery of symbols from the signal is lagging or leading actual symbols within the signal; and
adjusting the mixing frequency based on any lagging or leading.

17. The method of claim 11, wherein:
the method is performed in a first communication device and a second communication device;
the first communication device is coupled to the second communication device via the communication channel;
the first communication device includes a turbo encoder that is operable to encode at least one information bit thereby generating at least one of the first symbol, the second symbol, and the third symbol of the signal; and
the first communication device is operable to launch the signal into the communication channel.

18. The method of claim 11, wherein:
when performing Viterbi decoding, successively processing each of the alternatively selected symbols.

19. The method of claim 11, wherein:
the method is performed in at least one communication device.

20. The method of claim 11, wherein:
the method is performed in a first communication device and a second communication device;
the first communication device is coupled to the second at least one additional communication device via the communication channel;
the communication channel includes a relay satellite;
the second communication device is a satellite communication receiver; and
the first communication device is a communication transmitter.

21. An apparatus, comprising:
a first communication device that includes a turbo encoder having:
a first trellis encoder that is operable to encode data thereby generating first encoded data;
an interleaver that is operable to interleave the data thereby generating interleaved data;
a second trellis encoder that is operable to encode the interleaved data thereby generating interleaved encoded data;
an inverse interleaver that is operable to unscramble the interleaved encoded data that has been generated by the second trellis encoder thereby generating second encoded data; and
a switch that is operable alternatively to select symbols from the first encoded data and the second encoded data; and
a second communication device, coupled to the first communication device via a communication channel, that receives a signal that includes the first encoded data and the second encoded data and that includes a turbo decoder, a multiplier, and a synchronization module, wherein:
the multiplier is operable to multiply the signal by a mixing frequency to match a carrier frequency of the signal to assist in recovery of a first symbol, a second symbol, and a third symbol from the signal;
the synchronization module includes a Viterbi decoder, a phase detector, and a voltage controlled oscillator, wherein:
the Viterbi decoder and the phase detector each receive the mixed signal output from the multiplier;
the synchronization module is operable to recover the first symbol, the second symbol, and the third symbol from the signal;
the first symbol is followed by the second symbol;
the second symbol is followed by the third symbol;
the mixing frequency of the multiplier is governed by the voltage controlled oscillator; and
the Viterbi decoder operating with a zero traceback depth; and
the turbo decoder is operable to decode the first symbol, the second symbol, and the third symbol that are provided from the synchronization module to make best estimates of information bits encoded therein.

22. The apparatus of claim 21, wherein:
the Viterbi decoder is operable to consider the first symbol when estimating the second symbol; and the Viterbi decoder is operable to consider the first symbol and the second symbol when estimating the third symbol.

23. The apparatus of claim 21, wherein:
the Viterbi decoder is operable to consider the first symbol and the second symbol when estimating the third symbol; and
the phase detector is operable to employ at least one of the first symbol, the second symbol, and the third symbol to determine whether recovery of symbols from the signal, as performed by the synchronization module, is lagging or leading actual symbols within the signal and to adjust the voltage controlled oscillator based on any lagging or leading.

24. The apparatus of claim 21, wherein:
the Viterbi decoder is operable to consider the first symbol and the second symbol when estimating the third symbol;
the phase detector is operable to employ at least one of the first symbol, the second symbol, and the third symbol to determine whether recovery of symbols from the signal, as performed by the synchronization module, is lagging or leading actual symbols within the signal and to adjust the voltage controlled oscillator based on any lagging or leading; and
the adjustment of the voltage controlled oscillator is operable to make the mixing frequency to be substantially equal to the carrier frequency of the signal.

25. The apparatus of claim 21, wherein:
the third symbol output from the multiplier is provided simultaneously to both the Viterbi decoder and the phase detector;
the Viterbi decoder is operable to consider the first symbol and the second symbol when estimating the third symbol; and
the phase detector is operable to compare the third symbol output from the multiplier and the estimate of the third symbol as made by the Viterbi decoder to determine whether recovery of symbols from the signal, as performed by the synchronization module, is lagging or leading actual symbols within the signal and to adjust the voltage controlled oscillator based on any lagging or leading.

26. The apparatus of claim 21, wherein:
the first communication device is coupled to the second communication device via the communication channel;
the first at least one additional communication device includes a turbo encoder that is operable to encode at least one information bit thereby generating at least one of the first symbol, the second symbol, and the third symbol of the signal; and
the first communication device is operable to launch the signal into the communication channel.

27. The apparatus of claim 21, wherein:
the Viterbi decoder successively processes each of the alternatively selected symbols.

28. The apparatus of claim 21, wherein:
the signal is received by the second communication device; and
the communication channel couples the second communication device to a relay satellite.

29. The apparatus of claim 21, wherein:
the communication channel includes a relay satellite;
the second communication device is a satellite communication receiver; and
the first communication device is a communication transmitter.

30. A method for processing a signal, the method comprising:
performing first trellis encoding of data thereby generating first encoded data;
interleaving the data thereby generating interleaved data;
performing second trellis encoding of the interleaved data thereby generating interleaved encoded data;
performing inverse interleaving to unscramble the interleaved encoded data thereby generating second encoded data;
alternatively selecting symbols from the first encoded data and the second encoded data thereby generating a signal;
launching the signal into the communication channel;
receiving the signal from the communication channel;
recovering a first symbol, a second symbol, and a third symbol from the signal from the signal by multiplying the signal by a mixing frequency to match a carrier frequency of the signal and subsequent Viterbi decoding and phase detection of symbols generated by the frequency mixing, wherein:
the multiplied signal is simultaneously provided for Viterbi decoding and phase detection;
the first symbol is followed by the second symbol;
the second symbol is followed by the third symbol;
the Viterbi decoding operating with a zero traceback depth; and
when performing Viterbi decoding, considering the first symbol when estimating the second symbol;
when performing Viterbi decoding, considering the first symbol and the second symbol when estimating the third symbol; and employing a turbo decoder to decode the first symbol, the second symbol, and the third symbol that are recovered from the signal to make best estimates of information bits encoded therein.

31. The method of claim 30, further comprising:
employing at least one of the first symbol, the second symbol, and the third symbol when performing phase detection to determine whether recovery of symbols from the signal is lagging or leading actual symbols within the signal; and
adjusting the mixing frequency based on any lagging or leading.

32. The method of claim 30, further comprising:
employing at least one of the first symbol, the second symbol, and the third symbol when performing phase detection to determine whether recovery of symbols from the signal is lagging or leading actual symbols within the signal;
adjusting the mixing frequency based on any lagging or leading; and wherein:
the adjustment of the mixing frequency is operable to make the mixing frequency to be substantially equal to the carrier frequency of the signal.

33. The method of claim 30, further comprising:
when performing phase detection, comparing the third symbol output from the multiplying and the estimate of the third symbol as made in accordance with Viterbi decoding to determine whether recovery of symbols from the signal is lagging or leading actual symbols within the signal; and
adjusting the mixing frequency based on any lagging or leading.

34. The method of claim 30, wherein:
the method is performed in a first communication device and a second communication device;
the first communication device is coupled to the communication device via the communication channel;

the first communication device includes a turbo encoder that is operable to encode at least one information bit thereby generating at least one of the first symbol, the second symbol, and the third symbol of the signal; and
the first communication device is operable to launch the signal into the communication channel.

35. The method of claim 30, wherein:
when performing Viterbi decoding, successively processing each of the alternatively selected symbols.

36. The method of claim 30, wherein:
the method is performed in at least one communication device.

37. The method of claim 30, wherein:
the method is performed in a first communication device and a second communication device;
the first communication device is coupled to the second at least one additional communication device via the communication channel;
the communication channel includes a relay satellite;
the second communication device is a satellite communication receiver; and
the first communication device is a communication transmitter.

38. An apparatus, comprising:
a first communication device that includes a turbo encoder having:
  a first trellis encoder that is operable to encode data thereby generating first encoded data;
  an interleaver that is operable to interleave the data thereby generating interleaved data;
  a second trellis encoder that is operable to encode the interleaved data thereby generating interleaved encoded data;
  an inverse interleaver that is operable to unscramble the interleaved encoded data that has been generated by the second trellis encoder thereby generating second encoded data; and
  a switch that is operable alternatively to select symbols from the first encoded data and the second encoded data; and
a second communication device, coupled to the first communication device via a communication channel, that receives a signal that includes the first encoded data and the second encoded data and that includes a turbo decoder, a multiplier, and a synchronization module, wherein:
  the multiplier is operable to multiply the signal by a mixing frequency to match a carrier frequency of the signal to assist in recovery of a first symbol, a second symbol, and a third symbol from the signal;
  the synchronization module includes a Viterbi decoder, a phase detector, and a voltage controlled oscillator, wherein:
    the Viterbi decoder and the phase detector each receive the mixed signal output from the multiplier;
    the synchronization module is operable to recover the first symbol, the second symbol, and the third symbol from the signal;
    the first symbol is followed by the second symbol;
    the second symbol is followed by the third symbol;
    the mixing frequency of the multiplier is governed by the voltage controlled oscillator;
    the Viterbi decoder is operable to consider the first symbol when estimating the second symbol;
    the Viterbi decoder is operable to consider the first symbol and the second symbol when estimating the third symbol;
    the Viterbi decoder operating with a zero traceback depth; and
    the phase detector is operable to employ at least one of the first symbol, the second symbol, and the third symbol to determine whether recovery of symbols from the signal, as performed by the synchronization module, is lagging or leading actual symbols within the signal and to adjust the voltage controlled oscillator based on any lagging or leading; and
  the turbo decoder is operable to decode the first symbol, the second symbol, and the third symbol that are provided from the synchronization module to make best estimates of information bits encoded therein.

39. The apparatus of claim 38, wherein:
the adjustment of the voltage controlled oscillator is operable to make the mixing frequency to be substantially equal to the carrier frequency of the signal.

40. The apparatus of claim 38, wherein:
the third symbol output from the multiplier is provided simultaneously to both the Viterbi decoder and the phase detector.

41. The apparatus of claim 38, wherein:
the communication device is coupled to at least one additional communication device via the communication channel;
the at least one additional communication device includes a turbo encoder that is operable to encode at least one information bit thereby generating at least one of the first symbol, the second symbol, and the third symbol of the signal; and
the at least one additional communication device is operable to launch the signal into the communication channel.

42. The apparatus of claim 38, wherein:
the Viterbi decoder successively processes each of the alternatively selected symbols.

43. The apparatus of claim 38, wherein:
the signal is received by the second communication device;
the communication channel couples the second communication device to a relay satellite.

44. The apparatus of claim 38, wherein:
the communication channel includes a relay satellite;
the second communication device is a satellite communication receiver; and
the first communication device is a communication transmitter.

45. A method for processing a signal, the method comprising:
performing first trellis encoding of data thereby generating first encoded data; interleaving the data thereby generating interleaved data;
performing second trellis encoding of the interleaved data thereby generating interleaved encoded data;
performing inverse interleaving to unscramble the interleaved encoded data thereby generating second encoded data;
alternatively selecting symbols from the first encoded data and the second encoded data thereby generating a signal;
launching the signal into the communication channel;
receiving the signal from the communication channel;
recovering a first symbol, a second symbol, and a third symbol from the signal from the signal by multiplying the signal by a mixing frequency to match a carrier frequency of the signal and subsequent Viterbi decoding and phase detection of symbols generated by the frequency mixing, wherein:

the multiplied signal is simultaneously provided for Viterbi decoding and phase detection;
the first symbol is followed by the second symbol;
the second symbol is followed by the third symbol;
the phase detection involves employing at least one of the first symbol, the second symbol, and the third symbol to determine whether recovery of symbols from the signal is lagging or leading actual symbols within the signal and adjusting the mixing frequency based on any lagging or leading; and
the Viterbi decoding operating with a zero traceback depth; and
when performing Viterbi decoding, considering the first symbol when estimating the second symbol;
when performing Viterbi decoding, considering the first symbol and the second symbol when estimating the third symbol; and employing a turbo decoder to decode the first symbol, the second symbol, and the third symbol that are recovered from the signal.

46. The method of claim 45, wherein:
the adjustment of the mixing frequency is operable to make the mixing frequency to be substantially equal to the carrier frequency of the signal.

47. The method of claim 45, further comprising:
when performing phase detection, comparing the third symbol output from the multiplying and the estimate of the third symbol as made in accordance with Viterbi decoding to determine whether recovery of symbols from the signal is lagging or leading actual symbols within the signal.

48. The method of claim 45, wherein:
the method is performed in a first communication device and a second communication device;
the first communication device is coupled to the second communication device via the communication channel;
the first communication device includes a turbo encoder that is operable to encode at least one information bit thereby generating at least one of the first symbol, the second symbol, and the third symbol of the signal; and
the first communication device is operable to launch the signal into the communication channel.

49. The method of claim 45, wherein:
when performing Viterbi decoding, successively processing each of the alternatively selected symbols.

50. The method of claim 45, wherein:
the method is performed in at least one communication device.

51. The method of claim 45, wherein:
the method is performed in a first communication device and a second communication device;
the first communication device is coupled to the second communication device via the communication channel;
the communication channel includes a relay satellite;
the second communication device is a satellite communication receiver; and
the first communication device is a communication transmitter.

52. An apparatus, comprising:
a first communication device that includes a turbo encoder having:
  a first trellis encoder that is operable to encode data thereby generating first encoded data;
  an interleaver that is operable to interleave the data thereby generating interleaved data;
  a second trellis encoder that is operable to encode the interleaved data thereby generating interleaved encoded data;
  an inverse interleaver that is operable to unscramble the interleaved encoded data that has been generated by the second trellis encoder thereby generating second encoded data; and
  a switch that is operable alternatively to select symbols from the first encoded data and the second encoded data; and
a second communication device, coupled to the first communication device via a communication channel, that receives a signal that includes the first encoded data and the second encoded data and that includes a turbo decoder, a multiplier, and a synchronization module, wherein:
  the multiplier is operable to multiply the signal by a mixing frequency to match a carrier frequency of the signal to assist in recovery of a first symbol, a second symbol, and a third symbol from the signal;
  the synchronization module includes a Viterbi decoder, a phase detector, and a voltage controlled oscillator, wherein:
    the Viterbi decoder and the phase detector each receive the mixed signal output from the multiplier;
    the output of the Viterbi decoder is provided to the phase detector;
    the synchronization module is operable to recover the first symbol, the second symbol, and the third symbol from the signal such that the first symbol is followed by the second symbol and the second symbol is followed by the third symbol;
    the Viterbi decoder is operable to consider the first symbol when estimating the second symbol;
    the Viterbi decoder is operable to consider the first symbol and the second symbol when estimating the third symbol;
    the Viterbi decoder operating with a zero traceback depth;
    the phase detector is operable to employ at least one of the first symbol, the second symbol, and the third symbol to determine whether recovery of symbols from the signal, as performed by the synchronization module, is lagging or leading actual symbols within the signal and to adjust the voltage controlled oscillator based on any lagging or leading; and
    the adjustment of the mixing frequency by the voltage controlled oscillator is operable to make the mixing frequency to be substantially equal to the carrier frequency of the signal; and
  the turbo decoder is operable to decode the first symbol, the second symbol, and the third symbol that are provided from the synchronization module to make best estimates of information bits encoded therein.

53. The apparatus of claim 52, wherein: the first communication device is coupled to the second communication device via the communication channel;
the first communication device includes a turbo encoder that is operable to encode at least one information bit thereby generating at least one of the first symbol, the second symbol, and the third symbol of the signal; and
the first communication device is operable to launch the signal into the communication channel.

54. The apparatus of claim 52, wherein:
the signal is received by the second communication device;
the communication channel couples the second communication device to a relay satellite.

* * * * *

UNITED STATES PATENT AND TRADEMARK OFFICE
CERTIFICATE OF CORRECTION

PATENT NO. : 7,499,507 B2  Page 1 of 1
APPLICATION NO. : 09/729443
DATED : March 3, 2009
INVENTOR(S) : Steven T. Jaffe et al.

It is certified that error appears in the above-identified patent and that said Letters Patent is hereby corrected as shown below:

On Title Page, Item (54): The title should appear as follows: "Viterbi slicer for turbo codes"

Column 1, lines 1-2: The title should appear as follows: "Viterbi slicer for turbo codes"

Column 6, line 35, in Claim 10: remove "at least one additional"

Column 8, lines 12-13, in Claim 20: remove "at least one additional"

Column 9, line 47, in Claim 26: remove "at least one additional"

Column 10, lines 66-67, in Claim 34: replace "the first communication device is coupled to the communication" with --the first communication device is coupled to the second communication--

Column 11, lines 16-17, in Claim 37: remove "at least one additional"

Signed and Sealed this

Twelfth Day of May, 2009

JOHN DOLL
*Acting Director of the United States Patent and Trademark Office*